July 8, 1924.
H. P. GAGE
1,500,185
MEANS FOR INCREASING THE ILLUMINATING POWER FOR CORRUGATED LENSES
Filed Feb. 25, 1922
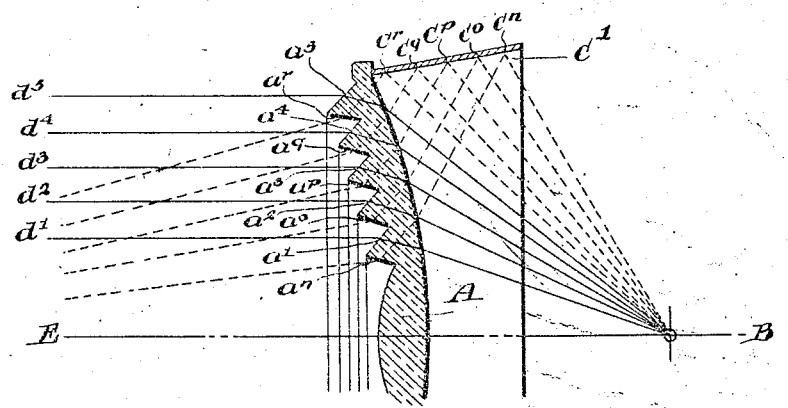
Inventor
Henry Phelps Gage
By Henry Cole
Attorneys Patented July 8, 1924.

1,500,185

UNITED STATES PATENT OFFICE.

HENRY PHELPS GAGE, OF CORNING, NEW YORK, ASSIGNOR TO CORNING GLASS WORKS, OF CORNING, NEW YORK, A CORPORATION OF NEW YORK.

MEANS FOR INCREASING THE ILLUMINATING POWER FOR CORRUGATED LENSES.

Original application filed October 29, 1920, Serial No. 420,412. Divided and this application filed February 25, 1922. Serial No. 539,099.

*To all whom it may concern:*

Be it known that I, HENRY PHELPS GAGE, a citizen of the United States of America, and a resident of Corning, in the county of Steuben, State of New York, have invented certain new and useful Improvements in Means for Increasing the Illuminating Power for Corrugated Lenses, of which the following is a specification.

This application is a division of my application Serial Number 420,412, filed October 29, 1920, for "means for increasing the illuminating power for corrugated lenses."

As is well known, the light flux delivered by a lens is greater, the greater the angle it subtends at the light source. It has, of course, been further proposed to increase the illuminating power by the use of a reflector situated behind the light source. To increase the angle of light utilized beyond a certain amount, introduces difficulties, in the design of lenses, owing to the extreme angles through which the light must be refracted, and also to reflection losses and to other similar causes, as is well known in the art.

My invention, therefore, has for its purpose to increase the illuminating power of lenses by utilizing a mirror, and so directing the rays reflected thereby, that the refractive faces in the lenses utilized for the proper direction of such rays, are faces which are utilized in the refraction of the light from a direct source, and hence may be shaped as desired, and this I preferably accomplish by utilizing an inverted corrugated or Fresnel lens in which the steps of the zones are utilized for the refraction of the direct rays from the light source and the risers, for the refraction of the rays reflected from the mirror.

For its more particular purpose, my present invention has as its object the provision of a system in which combined parallel and converging beams of light are projected.

A further object of my present invention is to provide a system in which the divergent rays from the light source are projected through the risers of the lens and produce a converging beam, while the direct rays from the light source are projected through the steps of the lens in a parallel beam.

The mirror utilized is an annular one, and is placed in front of the transverse plane of the light source, being of greater diameter than that part of the lens which it is intended to use in the transmission of the refracted light, as will be hereinafter more fully described and claimed.

Referring to the accompanying drawings,—

The figure is a longitudinal sectional central view through a Fresnel lens and mirror system embodying the invention.

Referring more particularly to Figure 1 of the drawing, the lens A, is shown as an inverted corrugated lens, the steps $a^1$, $a^2$ etc., of which are so formed as to have the same focus, and to project light rays falling directly on the rear face of the lens from the light source B, located at the principal focal point B of the system, in a parallel beam, as is shown by the full lines $B-a^1$, $d^1$, $B-a^2$, $d^2$, etc., as is well known.

An annular mirror $C^1$, in the form of a smooth or corrugated conoidal frustrum, is symmetrically located around the principal axis B—E of the system, between the light source, and the rear of the lens. The wall of the mirror $C^1$ is inclined to such an angle with the axis B—E of the system, that rays $B-c^n$, $B-C^o$, etc., from the light source B, are too divergent to strike the rear face of the lens A, and falling on the mirror, are reflected, wholly or substantially so to the rear of the lens, and after passing therethrough, impinge on the annular risers $a^n$, $a^o$, etc., at such angles that they are projected in a converging beam. Thus, in this form of the invention, the reflected divergent light rays from the light source B, which pass through the lens, form a converging beam having a focus different from that of the lens, should the latter be used without the mirror C, while the direct rays from the light source B, are projected through the lens in a parallel beam. Thus the light rays which pass through the lens, provide a system having a focus different from that of the lens, should the latter be used without the mirror C.

As far as possible, it is desirable to so arrange and shape the parts making up the system that the risers and steps are each parallel, or substantially parallel to the rays (direct or reflected) passing through the lens adjacent thereto, and impinging on the steps or risers, respectively, adjacent thereto, to prevent diffusion of light rays due to the same falling on faces not shaped to properly direct the same.

It is also to be understood that a mirror can also be used back of the light source if desired, and that the use of such mirror in no manner hinders or prevents satisfactory reflection of the annular reflecting mirror herein described.

Having thus described my invention what I desire to secure by Letters Patent is,—

1. In an optical system, the combination of a corrugated lens having steps and risers, a light source, and a conoidal mirror positioned between the lens and light source, the parts being so arranged that rays falling on the lens directly from the light source pass through the lens substantially parallel with the faces of the adjacent risers and are refracted by the steps in a substantially parallel bundle, and that rays falling on the lens after reflection by the mirror pass through the lens substantially parallel with the adjacent steps and are projected by the risers in a converging beam.

2. An optical system including in combination, a corrugated condensing lens having steps and risers, a light source, and a mirror positioned between the lens and light source for the purpose of reflecting rays from the light source through the risers of said lens, said system having a focus different from that of the lens alone.

3. In an optical system, the combination of a corrugated condensing lens having steps and risers, a light source, and a conoidal mirror positioned between said lens and light source, with steps of said lens being adapted to retract direct rays from said light source to substantial parallel beams, and said mirror being adapted to reflect divergent rays from the said light source through the risers of said lens whereby the latter rays will cross the former rays beyond the lens.

In testimony whereof I hereunto affix my signature.

HENRY PHELPS GAGE.